3,041,135
METHOD OF PURIFYING GAS UTILIZING POTASSIUM CARBONATE SOLUTIONS OF IMPROVED CONTACTING EFFICIENCY
Joseph F. Chittum, Whittier, Edgar James Owens, El Sobrante, and John B. Armstrong, Taft, Calif., assignors to California Research Corporation, San Francisco, Calif., a corporation of Delaware
No Drawing. Filed Sept. 30, 1959, Ser. No. 843,378
6 Claims. (Cl. 23—3)

This invention relates to improvements in processes for the removal of carbon dioxide and hydrogen sulfide from gaseous streams using an aqueous alkaline solution. In particular the invention is concerned with means for improving the rate of absorption and regeneration of the aforesaid mildly acidic gases in a hot aqueous potassium carbonate scrubbing medium.

Many processes are commercially practiced for the removal of $CO_2$ and/or $H_2S$ from normally gaseous streams, such as natural gas, by-product hydrogen, synthesis gas, and the like. In general, these processes comprise continuously circulating an aqueous scrubbing solution containing an alkanolamine or an alkali-metal carbonate, phosphate, or other salt between an absorption zone wherein the impure gas is contacted with the solution and a regeneration zone wherein absorbed gases are liberated from the solution. A recently developed process using an aqueous potassium carbonate solution offers considerable process and equipment economies where it is not required that the carbon dioxide, for example, be removed to an extremely low residual level.

In the commercial practice of such a process it was found that among the drawbacks to this system were an extremely high corrosion rate on carbon steel equipment and unusually low contacting efficiencies in the absorption and regeneration columns. Contacting efficiency may be defined as the number of theoretical or equilibrium contacting stages required to perform a desired separation divided by the actual number of contacting stages required, in the case of a tray-type column; or in the case of a packed column the efficiency is the number of equilibrium contacting stages multiplied by the height of packing equivalent to a theoretical stage and divided by the actual packing height required. Efficiencies of 20–35 percent are commonly observed and are considered acceptable in most commercial vapor-liquid contacting processes. However, when using a potassium carbonate solution containing 25–40 weight percent potassium carbonate for removing $CO_2$ and $H_2S$ from natural gas, contacting efficiencies of only 2.5–10 percent were observed. The expense involved in providing sufficient contacting equipment to compensate for these low efficiencies lessens the economic attractiveness of the process.

The low efficiencies may be attributed to the poor mass transfer characteristics of $CO_2$ and $H_2S$ in the carbonate solution and to inefficient contacting of the vapor and liquid in the columns. Thus, when in a laboratory test gas was bubbled through a 30 percent potassium carbonate solution at the temperatures employed in the absorption and regeneration columns, only relatively large bubbles were formed. These observations may be explained in terms of the unusual surface tension properties of the carbonate solution. We have found that by adding to the solution a small amount of certain petroleum sulfonates, described further hereinafter, the properties of the solution are sufficiently altered such that relatively small bubbles are formed and the contacting efficiency is markedly improved.

The activity of the petroleum sulfonates in this respect is enhanced by also incorporating in the scrubbing solution certain straight-chain amides of relatively high molecular weight. Desirably, the ingredients are added to the solution in a formulation which also contains an imidazoline corrosion inhibitor. Briefly, the invention comprises a method for improving the contacting efficiency of aqueous alkaline scrubbing solutions for the removal of acidic gases from normally gaseous streams by maintaining in the absorption medium a relatively small concentration of petroleum sulfonates, preferably in combination with straight-chain amides, and desirably added in conjunction with an imidazoline corrosion inhibitor formulation.

The petroleum sulfonates useful in the process of this invention include by-product sodium sulfonates having a molecular weight in the range 350–500. Alkyl aryl sulfonates having a molecular weight in the range 400–450 are particularly preferred. Such materials may be prepared, for example, by treating a solvent refined hydrocarbon fraction of suitable boiling range, containing mononuclear alkyl aryl hydrocarbons having one alkyl chain of 15 to 30 carbon atoms, e.g., a spray oil or white oil, with concentrated sulfuric acid to produce the sulfonic acid derivatives. The sulfonic acids are then neutralized with sodium hydroxide and extracted with alcohol-water to produce the petroleum sulfonates of this invention. These petroleum sulfonates are surface-active materials, and they may induce some foaming of the aqueous carbonate solution as a result of altering the surface tension of the solution. It is this froth and small bubble formation which is believed to result in the greatly improved contacting efficiencies observed, since the area of contact between the gas and liquid phases is thereby greatly extended. Thus, the improved results of this invention are obtained by inducing conditions opposite to what is commonly viewed as good engineering practice. That is, the formation of foams and froths is generally avoided in contacting apparatus due to the prevailing opinion that such conditions lead to poor performance, flooding, entrainment, and like problems. We have found in the practice of our invention that the only problem of this type requiring consideration is entrainment and that this is readily corrected by installing simple demisting devices.

The petroleum sulfonates are continuously or intermittently added to the circulating carbonate solution as required to provide a concentration therein of from 20 to 2000 parts per million by weight, or more, but preferably 200–1000 p.p.m.

The action of the sulfonates is enhanced when straight-chain amides are also added to the carbonate solution. The amides themselves exhibit some surfactant properties, but they apparently serve primarily to stabilize the sulfonate-induced foam or to toughen the bubble film. The straight-chain amides employed are desirably paraffinc and contain 12–20, preferably about 18, carbon atoms to the molecule. Such amides are commercially available, or they may be conveniently prepared from the corresponding carboxylic acids by reaction with ammonia. The beneficial interaction between the amides and sulfonates is observed when the mole ratio of amide to sulfonate is between about 1:9 and 3:1. Preferably these materials are added together in the range of proportions indicated to provide a total concentration of the composite of about 200–1500 p.p.m. in the aqueous carbonate solution.

As indicated earlier, the hot concentrated potassium carbonate-bicarbonate solution is quite corrosive to carbon steels. The use of potassium dichromate has been recommended in the literature as a corrosion inhibitor. However, when treating gases containing $H_2S$, it was found that the dichromate was reduced to insoluble chromium oxides which precipitated from solution. Other corrosion inhibitors, such as ferrocyanide-type compounds, were found to be oxidized to insoluble precipitates by the action of a small amount of oxygen in the gas treated. Small quantities of oxygen may be introduced into natural gas, for example, due to air leakage in the vacuum gas gathering system and when the gas is separated from oil in field tanks. Similarly, synthesis gas produced by combustion reforming may contain small quantities of residual oxygen. We have found that a particularly effective corrosion inhibitor which is non-reactive either with oxygen or $H_2S$ may be prepared from castor oil and diethylenetriamine. The principal reaction product and active ingredient is 1-aminoethyl-2-(hydroxyheptadecanyl)-imidazoline; that is, the imidazoline derivative of ricinoleic acid. However, since castor oil is not pure ricinoleic acid, there are some other nitrogen derivatives and by-products present in the formulation. Consequently, the corrosion inhibitor is best identified simply as the imidazoline reaction product of castor oil and diethylenetriamine. The imidazoline compound is usefully employed as a corrosion inhibitor in the aqueous carbonate system in concentrations between 200 and 2000 p.p.m., preferably 300 to 1500 p.p.m.

The corrosion inhibitor and the surface-active agents have a cooperative action in performing their separate functions. Thus, the surfactants enhance the ability of the imidazoline corrosion inhibitor to adhere to and substantially coat the metal surfaces as a molecular film. Without the surfactants the film is less tightly bound to the metal, and higher concentrations of the inhibitor must be used. Likewise, it is believed that the ricinoleic imidazoline in some way contributes to the alteration of the surface tension of the carbonate solution.

EXAMPLE

An additive formulation was prepared having the following approximate composition by weight:

Table I

| | Percent |
|---|---|
| Imidazoline (castor oil-diethylenetriamine) | 30 |
| Petroleum sulfonates, 400-450 M.W. | 20 |
| $C_{18}$ straight-chain amides | 15 |
| Isopropyl alcohol | 25 |
| Water | 10 |

The imidazoline used was the reaction product of castor oil and diethylenetriamine. Isopropyl alcohol was selected as the carrier solvent as a matter of convenience. Other solvents, such as methanol, may also be used. The small amount of water serves to improve the fluidity of the mixture. In some applications a small amount of an alkyl aromatic oil may also be incorporated in the additive.

This formulation was added to a 30 weight percent solution of potassium carbonate in water to provide an imidazoline concentration of about 1000 p.p.m., and a concentration of combined amides and sulfonates of about 1150 p.p.m. The solution was used to scrub $CO_2$ and $H_2S$ from natural gas at a contacting rate of about 2500 standard cubic feet of gas per hour per gallon per minute of circulating solution. Operating conditions are presented in Table II, which also shows the results obtained with and without the additive.

Table II

| | Without Additive | With Additive |
|---|---|---|
| Percent $CO_2$ in Natural Gas Feed | 9.3 | 9.3 |
| Percent $CO_2$ in Natural Gas Effluent | 3.5 | 2.9 |
| Absorber Pressure, p.s.i.g | 413 | 410 |
| Absorber Temperature, °F | 249 | 248 |
| Regenerator Pressure, p.s.i.g | 15.4 | 14.6 |
| Regenerator Temperature, °F | 243 | 241 |
| Absorber, Tray Efficiency, percent | 6.3 | 8.5 |
| Regenerator, Tray Efficiency, percent | 7.8 | 8.9 |
| Corrosion Rate on Carbon Steel, mils/year | 6,000 | 800 |

The absorption and regeneration zones were conventional bubble-cap tray columns.

In another test carried out under the same conditions as the above example, but adding only the petroleum sulfonate without amides or corrosion inhibitor, a comparable increase in tray efficiency was observed, but the corrosion rate remained high.

Although our invention has particular utility in rendering operable the hot potassium carbonate process for removing $CO_2$ from gases, and has been described with particular reference thereto, it is believed that the sulfonates, amides and imidazoline additives disclosed herein will be found equally valuable for use in similar gas contacting processes. Thus, the addition of the petroleum sulfonates and straight-chain amides, alone or in combination, may provide an inexpensive means of increasing the capacity of existing gas purification systems, such as those employing an alkanolamine reagent. Likewise, the castor oil imidazoline has been shown to be a highly effective corrosion inhibitor in a number of applications.

We claim:

1. In a process for the removal of mildly acidic gases selected from the group consisting of $CO_2$ and $H_2S$ from a gaseous stream containing at least one of said gases using an aqueous potassium carbonate scrubbing solution continuously circulated between an absorption zone and a regeneration zone, the method of improving the contacting efficiency of said solution which comprises maintaining in said circulating solution a minor concentration of above about 20 p.p.m. of sodium petroleum sulfonates having a molecular weight in the range 350-500.

2. In a process for the removal of mildly acidic gases selected from the group consisting of $CO_2$ and $H_2S$ from a gaseous stream containing at least one of said gases using an aqueous potassium carbonate scrubbing solution continuously circulated between an absorption zone and a regeneration zone, the method of improving the contacting efficiency of said solution which comprises maintaining in said circulating solution a minor concentration of sodium petroleum sulfonates together with straight-chain amides sufficient to cause a stable froth.

3. In a process for the removal of carbon dioxide and hydrogen sulfide from a normally gaseous hydrocarbon stream using an aqueous potassium carbonate solution continuously circulated between an absorption zone and a regeneration zone, the method of improving the contacting efficiency of said solution which comprises maintaining in said circulating solution a minor concentration of above about 20 p.p.m. of sodium petroleum sulfonates having a molecular weight in the range 350-500.

4. The process of claim 3 wherein said petroleum sulfonates are added together with straight-chain amides having 18 carbon atoms to the molecule, the molecular ratio of said amides to said sulfonates being within the range 1:9 and 3:1.

5. The process of claim 3 wherein said petroleum sulfonates are added together with an imidazoline corrosion inhibitor and straight-chain amides, the whole of said sulfonates, imidazolines, and amides being dissolved in an isopropyl alcohol carrier.

6. The process of claim 5 wherein said corrosion inhibitor comprises the imidazoline reaction product of castor oil and diethylenetriamine, and the concentration of said imidazoline is maintained between 300 and 2000 p.p.m.

References Cited in the file of this patent

UNITED STATES PATENTS

| 1,817,778 | Sperr | Aug. 4, 1931 |
| 1,843,862 | Buc | Feb. 2, 1932 |
| 2,368,600 | Rosenstein | Jan. 30, 1945 |
| 2,776,870 | Fischer | Jan. 8, 1957 |
| 2,886,405 | Benson et al. | May 12, 1959 |